(12) United States Patent  
Sohn et al.

(10) Patent No.: US 9,609,106 B2
(45) Date of Patent: Mar. 28, 2017

(54) DISPLAY APPARATUS FOR RELEASING LOCK STATUS AND METHOD THEREOF

(71) Applicant: Samsung Electronics Co., Ltd., Gyeonggi-do (KR)

(72) Inventors: Jung-joo Sohn, Seoul (KR); Ji-yeon Kwak, Seoul (KR); Nipun Kumar, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 148 days.

(21) Appl. No.: 14/368,213

(22) PCT Filed: Dec. 10, 2012

(86) PCT No.: PCT/KR2012/010675
§ 371 (c)(1),
(2) Date: Jun. 23, 2014

(87) PCT Pub. No.: WO2013/094909
PCT Pub. Date: Jun. 27, 2013

(65) Prior Publication Data
US 2015/0304475 A1    Oct. 22, 2015

(30) Foreign Application Priority Data

Dec. 23, 2011  (KR) .......................... 10-2011-0141804

(51) Int. Cl.
*G06F 3/033* (2013.01)
*H04M 1/673* (2006.01)
(Continued)

(52) U.S. Cl.
CPC .......... *H04M 1/673* (2013.01); *G06F 3/0488* (2013.01); *G06F 3/04842* (2013.01);
(Continued)

(58) Field of Classification Search
CPC ................................................ G06F 3/04886
(Continued)

(56) References Cited

U.S. PATENT DOCUMENTS 7,479,949 B2 *  1/2009  Jobs .................... G06F 3/0488
                                                   345/169
8,451,232 B2 *  5/2013  Tolmasky ........... G06F 3/04886
                                                   345/173
(Continued)

FOREIGN PATENT DOCUMENTS

KR    1020090013432 A    2/2009
KR    1020100073743 A    7/2010

OTHER PUBLICATIONS

PCT/ISA/237 Written Opinion issued on PCT/KR2012/010675 (pp. 4).
PCT/ISA/210 Search Report issued on PCT/KR2012/010675 (pp. 2).

*Primary Examiner* — William Titcomb
(74) *Attorney, Agent, or Firm* — The Farrell Law Firm, P.C.

(57) ABSTRACT

A display apparatus and method of using the same is provided. The display apparatus includes a display unit for displaying a lock view comprising an affordance object including a connected section and a disconnected section; and a control unit for, when drawing is performed according to user touch on the lock view and the disconnected section is connected by the drawing, controlling the display unit to switch to an unlock view.

16 Claims, 7 Drawing Sheets

(51) Int. Cl.
  *G06F 3/0488* (2013.01)
  *G06F 21/36* (2013.01)
  *H04M 1/66* (2006.01)
  *G06F 3/0484* (2013.01)

(52) U.S. Cl.
  CPC ...... *G06F 3/04845* (2013.01); *G06F 3/04847* (2013.01); *G06F 21/36* (2013.01); *H04M 1/66* (2013.01); *H04M 2250/22* (2013.01)

(58) Field of Classification Search
  USPC .......................................................... 715/863
  See application file for complete search history.

(56) References Cited

U.S. PATENT DOCUMENTS

| | | | | |
|---|---|---|---|---|
| 9,298,368 | B2* | 3/2016 | Ording | G06F 3/04886 |
| 2008/0165136 | A1* | 7/2008 | Christie | G06F 3/0482 |
| | | | | 345/173 |
| 2009/0006292 | A1 | 1/2009 | Block | |
| 2009/0036100 | A1 | 2/2009 | Lee | |
| 2009/0077497 | A1* | 3/2009 | Cho | G06F 3/04817 |
| | | | | 715/814 |
| 2009/0285383 | A1* | 11/2009 | Tsuei | G06F 3/04883 |
| | | | | 379/242 |
| 2009/0310010 | A1* | 12/2009 | Matsushima | G06F 9/445 |
| | | | | 348/333.01 |
| 2010/0144401 | A1* | 6/2010 | Azuma | H04M 1/6091 |
| | | | | 455/569.2 |
| 2010/0162182 | A1 | 6/2010 | Oh et al. | |
| 2011/0037705 | A1* | 2/2011 | Yilmaz | G06F 3/023 |
| | | | | 345/173 |
| 2011/0083110 | A1* | 4/2011 | Griffin | G06F 3/04886 |
| | | | | 715/863 |
| 2011/0164056 | A1* | 7/2011 | Ording | G06F 1/1694 |
| | | | | 345/649 |
| 2011/0167366 | A1* | 7/2011 | Wagner | G06F 3/0483 |
| | | | | 715/765 |
| 2011/0167375 | A1* | 7/2011 | Kocienda | G06F 1/3203 |
| | | | | 715/773 |
| 2011/0175826 | A1* | 7/2011 | Moore | G06F 3/04886 |
| | | | | 345/173 |
| 2011/0221678 | A1* | 9/2011 | Davydov | G06F 3/0486 |
| | | | | 345/168 |
| 2011/0221685 | A1* | 9/2011 | Lee | G06F 3/0482 |
| | | | | 345/173 |
| 2011/0242361 | A1* | 10/2011 | Kuwahara | A63F 13/10 |
| | | | | 348/231.4 |
| 2011/0283241 | A1 | 11/2011 | Miller et al. | |
| 2011/0296356 | A1 | 12/2011 | Chaudhri et al. | |
| 2011/0302519 | A1* | 12/2011 | Fleizach | G06F 3/03547 |
| | | | | 715/773 |
| 2012/0113007 | A1* | 5/2012 | Koch | G06F 3/0488 |
| | | | | 345/168 |
| 2013/0167053 | A1* | 6/2013 | Kwak | H04M 1/72519 |
| | | | | 715/764 |
| 2015/0040031 | A1* | 2/2015 | Lee | G06F 17/3089 |
| | | | | 715/748 |

\* cited by examiner

Flicking

Tapping

DISPLAY APPARATUS FOR RELEASING LOCK STATUS AND METHOD THEREOF

PRIORITY

The present invention is a National Phase Entry of PCT International Application No. PCT/KR/2012/010675, which was filed on Dec. 10, 2012, and claims priority to Korean Patent Application Serial No. 10-2011-0141804, which was filed in the Korean Intellectual Property Office on Dec. 23, 2011, the entire disclosure of each of which is hereby incorporated by reference.

BACKGROUND OF THE INVENTION

1. Field of Invention

The present invention relates generally to a display apparatus and a method for releasing a lock status thereof, and more particularly, the present to a display apparatus for releasing a lock status using an affordance object displayed in a lock view, and a method for releasing the lock status.

2. Description of Related Art

In accordance with the advance of electronic technology, various display devices are developed and supplied. In recent, use of display devices, such as smart phones or tablet Personal Computers (PCs), supporting various applications is rapidly increasing.

The display device mostly includes a large touch screen so that a user can control his/her manipulation more easily as viewing contents. However, using the large touch screen, the screen of the display device can be touched to execute a function even when the user does not intend to.

To avoid this, the display device can support a lock function. Even when the screen is touched or a key is selected in the lock status, no function is performed at all. The user can release the lock status with a preset manipulation.

The user manipulation for releasing the lock status can be defined by a display device manufacturer. For example, the manufacturer can design to release the lock status only through a predefined manipulation within a fixed part on the screen.

When the fixed manipulation is continued in the fixed part of the screen as in a conventional apparatus, pixels of the corresponding part or touch sensors under the screen can be repeatedly used, which can result in a degradation of the sensing performance.

Also, it does not meet user's needs for a more dynamic and interesting User Interface (UI).

Therefore, there exists a need for unlocking methods, which do not use the fixed part of the screen, and that are easy to operate.

SUMMARY OF THE INVENTION

An aspect of the present invention is to solve the above-mentioned and/or other problems and disadvantages.

Accordingly, an aspect of the present invention is to provide a display apparatus with which a user can easily and intuitively release a lock status using an affordance object, and a method for releasing the lock status.

In accordance with an aspect of the present invention, a display apparatus is provided. The display apparatus comprising: a display unit for displaying a lock view comprising an affordance object including a connected section and a disconnected section; and a control unit for, when drawing is performed according to user touch on the lock view and the disconnected section is connected by the drawing, controlling the display unit to switch to an unlock view.

In accordance with another aspect of the present invention, a method for releasing a lock status is provided. The method includes displaying a lock view comprising an affordance object including a connected section and a disconnected section; drawing according to user touch on the lock view; and when the disconnected section is connected by the drawing, switching to an unlock view.

According to the various embodiments of the present invention, the user can easily release the lock using the affordance object. Hence, the concentrated use of a particular part of the screen can be prevented and the user s satisfaction can be increased.

BRIEF DESCRIPTION OF DRAWINGS

The above and other aspects, features, and advantages of certain embodiments of the present invention will be more apparent from the following detailed description when read in conjunction with the accompanying drawings, in which.

DETAILED DESCRIPTION OF EMBODIMENTS OF THE PRESENT INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

The terms and words used in the following description and claims are not limited to their dictionary meanings, but are merely used by the inventor to enable a clear and consistent understanding of the invention. Accordingly, it should be apparent to those skilled in the art that the following description of the embodiments of the present invention is provided for illustration purpose and not to limit the invention, as will defined by the appended claims and their equivalents. Further, those of ordinary skill in the art will recognize that various changes and modifications of the embodiments described herein can be made without departing from the scope and spirit of the present invention.

Figure 1:
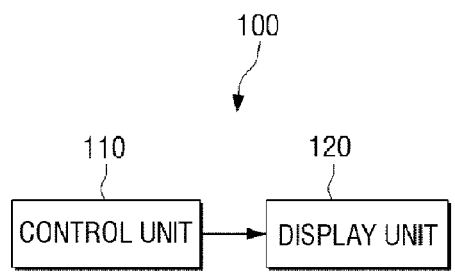
FIG. 1 is a block diagram of a display apparatus, according to an embodiment of the present invention.

FIG. 1 is a block diagram of a display apparatus according to an embodiment of the present invention. Referring to FIG. 1, the display apparatus 100 includes a control unit 110 and a display unit 120.

The control unit 110 controls operations of the display apparatus 100. The control unit 110 can control hardware of the display apparatus 100 and support various functions by executing an Operating System (O/S) or various applications stored to a memory of the display apparatus 100.

When the display apparatus 100 is turned on or reset, when the ongoing function of the display apparatus 100 is completed, or when there is no users manipulation or no operation of the display apparatus 100 during a certain time, the control unit 110 operates in a lock status. When an event such as user screen touch or button selection in the display apparatus 100 in the lock status occurs, the control unit 110 controls the display unit 120 to display a lock view The display unit 120 displays the lock view including an affordance object. The affordance object indicates an object generated to induce the users manipulation. More specifically, the affordance object can be an unfinished image including a disconnected section. The user can manipulate to complete the unfinished image. When such a manipulation is conducted, the control unit 110 controls the display unit 120 to switch to an unlock view.

Figure 2:
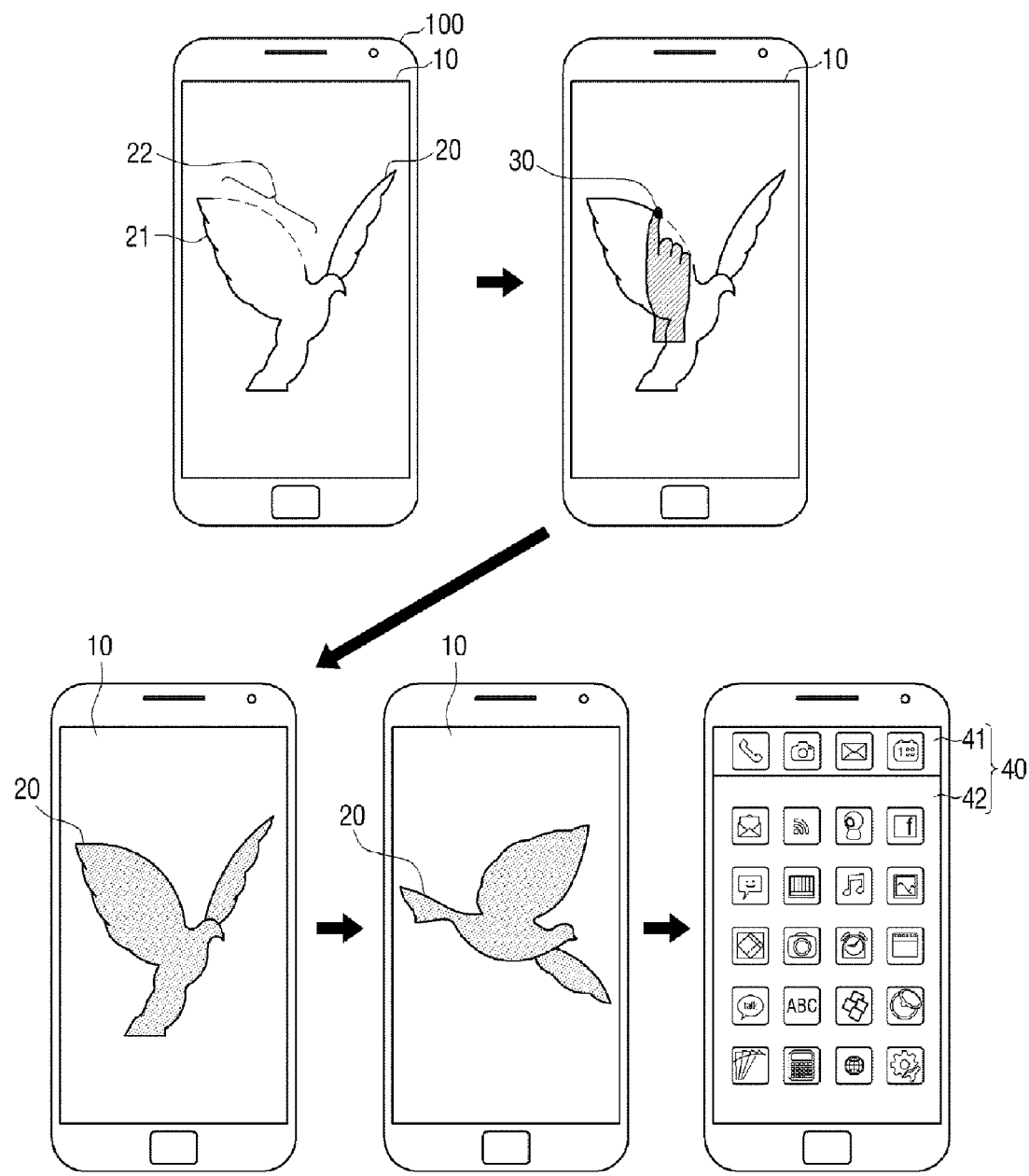
FIGS. 2 and 3 are diagrams of various unlocking methods of the display apparatus, according to an embodiment of the present invention.

FIG. 2 depicts an affordance object. Referring to FIG. 2, an affordance object 20 displayed on a lock view 10 includes a connected section 21 and a disconnected section 22. When a user touches the screen, drawing is executed along a touch trace 30. In FIG. 2, the disconnected section 22 is displayed as a dotted line so that the user can easily understand that the corresponding section 22 is not connected. Although the user arbitrarily draws, rather than drawing along the dotted line of the disconnected section 22, when the initial touch point and the last touch point are both end points of the disconnected section, the control unit 110 determines that the disconnected section is connected.

When the disconnected section is connected, the control unit 110 controls the display unit 120 to switch to an unlock view 30 while changing a display state of the affordance object 200. When the affordance object 220 is displayed as an outline image of life such as bird and the user draws the disconnected section 22, as shown in FIG. 2, the affordance object 200 is changed to fill the inside of the affordance object 200, to change into a real life image and to represent as if the corresponding image moves. Next, an unlock view 40 is displayed.

The unlock view 40 can be a background image including a fixed menu region 41 and an icon display region 42. The fixed menu region 41 indicates a region for displaying menus of functions frequently used by the user, such as call, message check, Internet connection, and recent call list, or default functions. The icon display region 42 can be a region for arranging applications, widgets, folder icons, and menus installed to the display apparatus 100.

For example, the unlock view 40 can be an execution view generated by the execution of a particular application. When the lock is released, the execution view of an application used before the display apparatus 100 enters the lock status, a default application, or an application frequently used can be displayed immediately.

Figure 3:
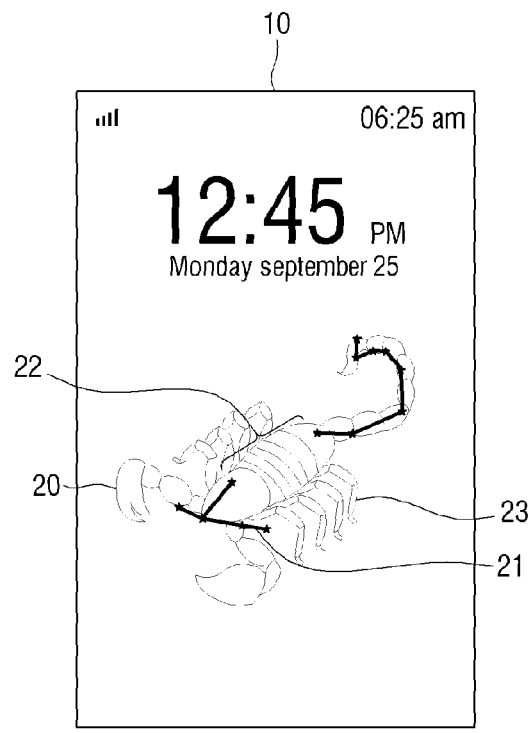

FIG. 3 is a diagram of a lock view 10, according to another embodiment of the present invention. In FIG. 3, a constellation image is used as the affordance object 20. Referring to FIG. 3, the affordance object 20 includes a connected section 21, a disconnected section 22, and an additional image 23. The additional image 23 is an image represented so that the user can easily notice a zodiac sign implied by the affordance object 20.

Meanwhile, the lock view 10 can display basic information such as time, date and weather in addition to the affordance object as shown in FIG. 3. The basic information can be displayed at adequate locations on the lock view 10 not to overlap with the affordance object.

Figure 4:
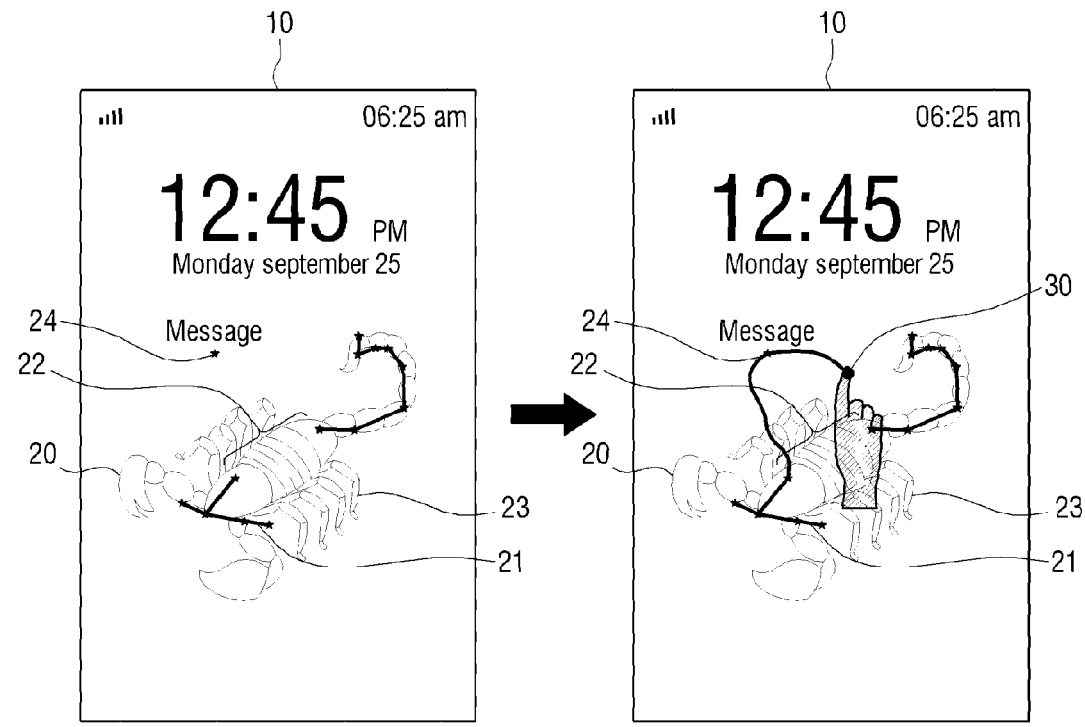
FIG. 4 is a diagram of a lock view for immediately executing a function on the lock view, according to another embodiment of the present invention.

FIG. 4 depicts another lock view 10, according to another embodiment of the present invention. Referring to FIG. 4, the affordance object 20 on the lock view 10 is represented as an unfinished image including a disconnected section. A menu point 24 is displayed around the affordance object 20. The user can complete the image by drawing the disconnected section 30 via the menu point 24. As such, when the menu point 24 is selected and the image is completed, the lock can be automatically released and a function corresponding to the menu point 24 can be executed immediately. Thus, a function execution view can be immediately displayed. While only the menu point 24 mapped to a message check function is depicted in FIG. 4, a plurality of menu points 24 can be provided.

While the affordance image uses the life image and the constellation image in the above-stated embodiments, the affordance object can be realized in various forms. Such affordance objects may be generated by detecting an outline part of a photo captured by the user.

Meanwhile, the display unit 120 may display a text or an indicator image instructing to touch the affordance object in a side of the affordance object so that the user can more clearly understand that the affordance object needs to be touched to release the lock. Alternatively, the disconnected section may be flickered or represented as the dotted line so that the user can intuitively recognize the touch.

The display apparatus 100 can be implemented using various devices including a TV, a table PC, a PC, a notebook PC, a digital frame, an e-book, a PDA, and a mobile phone. A display apparatus having the communication capability, such as mobile phone, can receive a call in the lock status. In this case, the affordance object can be changed to determine whether to receive or reject the call in the lock view.

Figure 5:
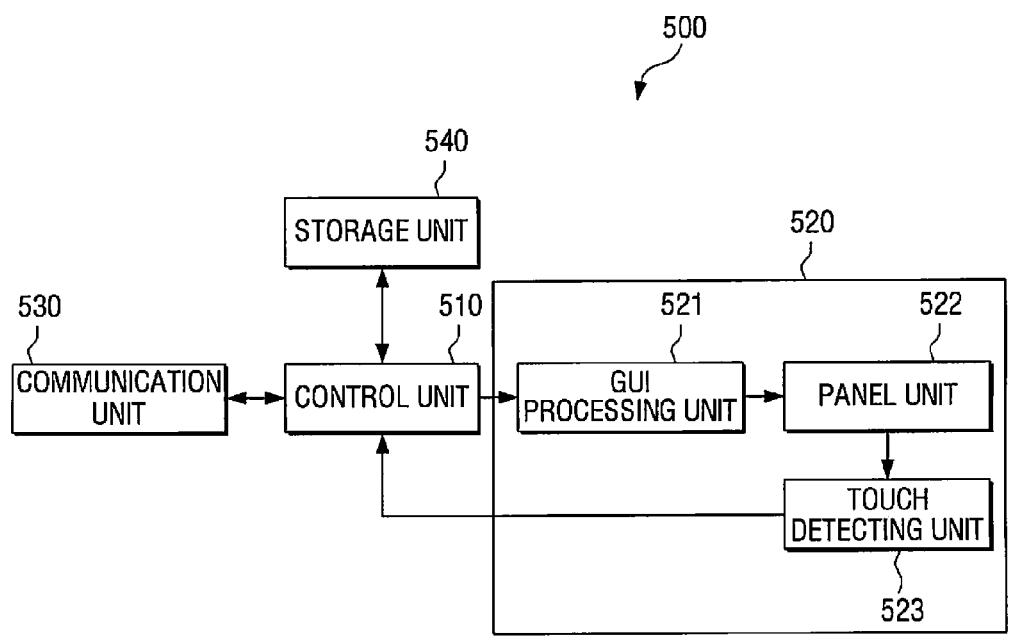
FIG. 5 is a block diagram of a display apparatus, according to another embodiment of the present invention.

FIG. 5 is a block diagram of a display apparatus 500 according to another embodiment of the present invention. Referring to FIG. 5, the display apparatus 500 includes a control unit 510, a display unit 520, a communication unit 530, and a storage unit 540.

The display unit 520 includes a Graphical User Interface (GUI) processing unit 521, a panel unit 522, and a touch detecting unit 523. Using setup information stored to the storage unit 540, the GUI processing unit 521 generates screen configuration data of various types such as lock view, unlock view, and application execution view. Based on the screen configuration data generated by the GUI processing unit 521, the panel unit 522 displays the view by driving hardware including a Liquid Crystal Display (LCD) display panel and a backlight unit. The touch detecting unit 523 provides coordinates of the users touch point to the control unit 510 using a touch sensor equipped in the panel unit 522.

The control unit 510 controls the GUI processing unit 521 and the panel unit 522 to output the view corresponding to the current status of the display apparatus. Using the coordinates provided from the touch detecting unit 523, the control unit 510 calculates the users touch point, touch trace, and movement speed. Based on the calculation results, the control unit 510 determines whether to tilt the affordance object.

The storage unit 540 stores O/S, applications, widget programs, and data. In particular, the storage unit 540 can store information relating to at least one of the various affordance objects as mentioned above.

The control unit 510 can be driven by the O/S stored to the storage unit 540 to execute various applications or widget programs selected by the user and to carry out the function. When it is necessary to switch to the lock status, the control unit 510 enters the lock status so that the display apparatus does not respond to any key manipulation or any touch of the user. When the user arbitrarily manipulates the key or touches the screen in the lock status, the control unit 510 controls the display unit 120 to generate and display the lock view.

The communication unit 530 receives a call connection request over a telephone network. When the call is connected, the communication unit 530 converts the users input voice to a voice signal, transmits to the other telephone over the telephone network, converts a voice signal received from the other telephone, and provides to a speaker (not shown).

When the affordance object is touched in the displayed lock view, the control unit 510 controls the display unit 520 to change the affordance object so as to represent a natural phenomenon change corresponding to the touch and to switch to the unlock view. When the storage unit 540 stores affordance objects of various types, the control unit 510 may randomly determine the affordance object displayed in the lock view. Hence, the affordance object can differ in every lock view.

Meanwhile, in the lock status with the lock view displayed, when the call connection request is received through the communication unit 530, the control unit 510 can modify the form or the number of the affordance object so that the user can select whether to connect or reject the call.

When the call connection request is received through the communication unit 530 even in the unlock status, the control unit 510 can control the display unit 520 to display the affordance objects so as to select whether to connect or reject the call.

Figure 6:
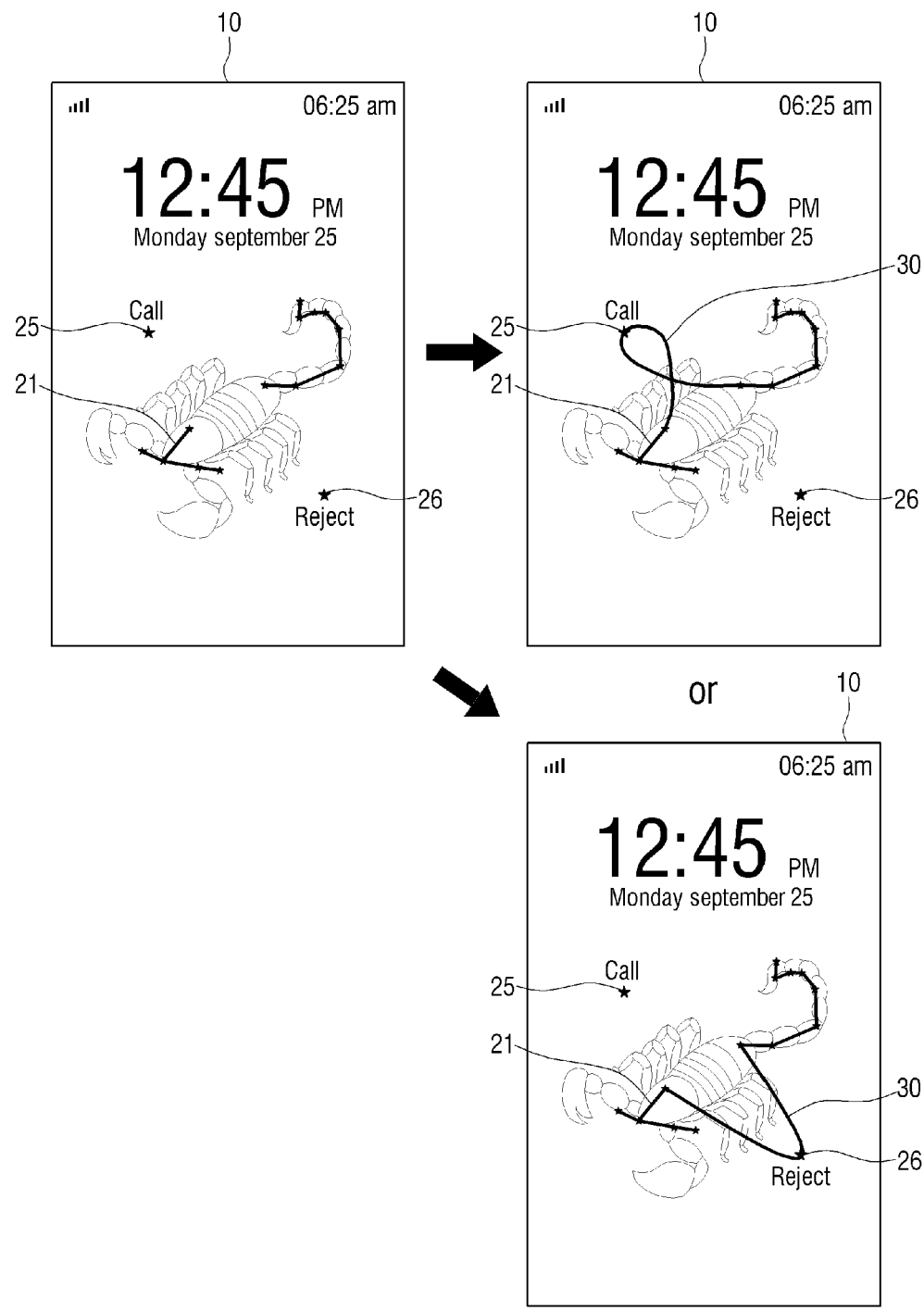
FIG. 6 is a diagram of lock view display change when a call connection request is received, according to an embodiment of the present invention.

FIG. 6 is a diagram of the lock view change, according to an embodiment of the present invention, when the call connection request is received. Referring to FIG. 6, when the call connection request is received while the lock view 10 including the affordance object 20 of FIG. 2 is displayed, the lock view 10 displays a plurality of menu points 25 and 26.

Among them, the first menu point 25 is mapped to a call connection function and the second menu point 26 is mapped to a call connection rejection function. The user can perform his/her intended function by drawing via one of the first menu point 25 and the second menu point 26. The drawing trajectory is not limited the straight line and can adopt various shapes.

When the drawing passes through the first menu point 25 in FIG. 6, the call can be connected and the lock view 10 can switch to a call connection view (not shown).

Although it is not illustrated in FIG. 6, when the call connection request is received, information such as image, name, or phone number of the caller may be displayed in a part of the lock view 10. Also, the affordance object itself can be changed to a different affordance object. That is, when the affordance object of FIG. 2 is displayed and the call is received, the affordance object of FIG. 3 or 6 can be displayed.

The call connection request can be received outside of the lock status. In this case, the control units 110/510 can control the display units 120/520 to display the affordance object of FIG. 6 and connect the call or reject the call connection according to the drawing state of the affordance object.

Besides, there can be various operation modes in addition to the call connection request received, for example, a mode for checking a text message or a mail received, a power-save mode due to the lack of the remaining battery capacity, and a mode for outputting an alarm signal when an alarm set time arrives. In these modes, the control units 110/510 can enter various operation modes such as mail check mode, power-saving mode, and alarm output mode.

Upon entering such an operation mode, the control units 110/510 can control the display units 120/520 to display menu points respectively mapped to new functions selectable in the corresponding operation mode. For example, when the text message or the mail is received, a menu point mapped to the function for checking the text message or the mail can be displayed around the affordance object.

When the alarm set time arrives and the alarm output mode for outputting the alarm signal is transited, the control units 110/510 can display a menu point mapped to an alarm stop function or a menu point mapped to an alarm reset function after 5 minutes.

Besides, when entering the power-save mode, a plurality of menu points mapped to a function for returning to the normal mode and a function for maintaining the power-save mode may be displayed. The type and the location of the menu point can randomly vary.

FIGS. 7-11 are diagrams of various user manipulations.

Figure 7:
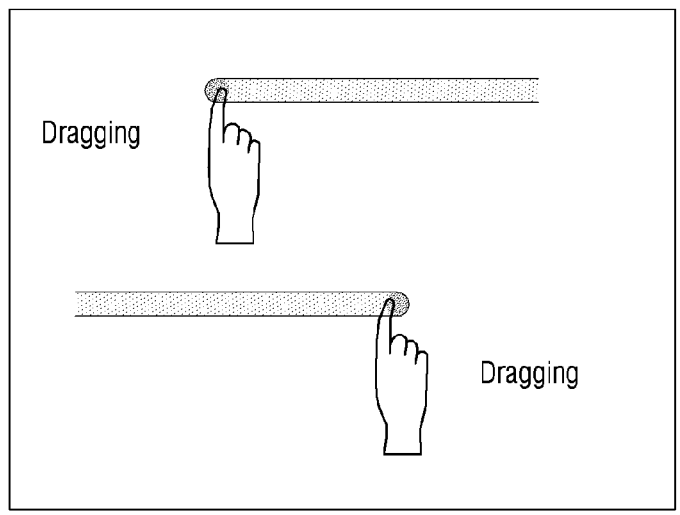
FIGS. 7-11 are diagrams of various user manipulations, according to another embodiment of the present invention.
Figure 8:
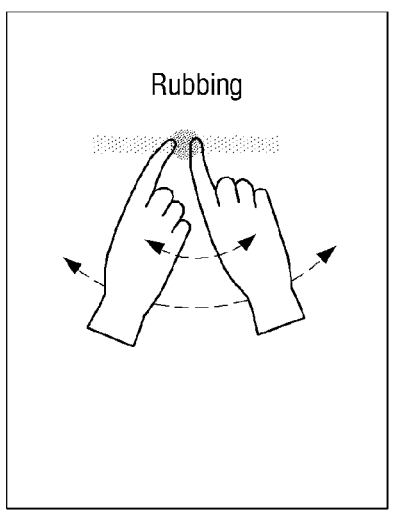
Figure 9:
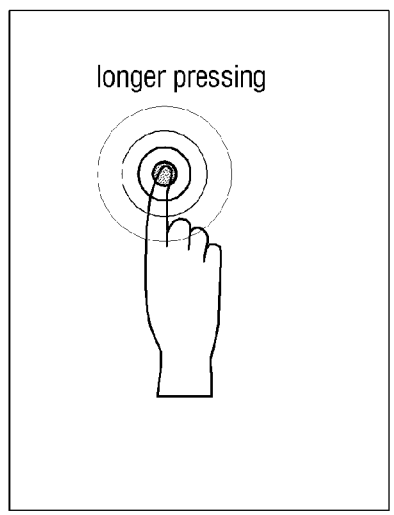
Figure 10:
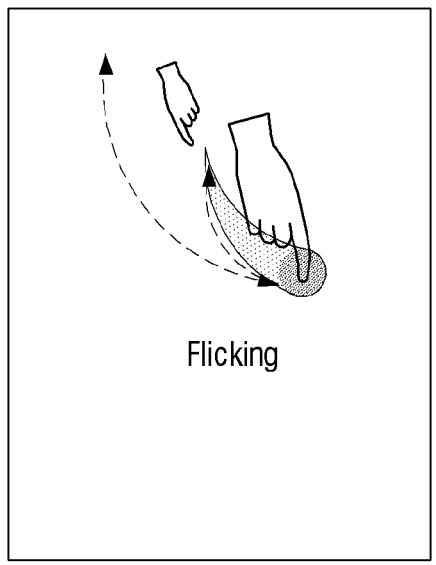
Figure 11:
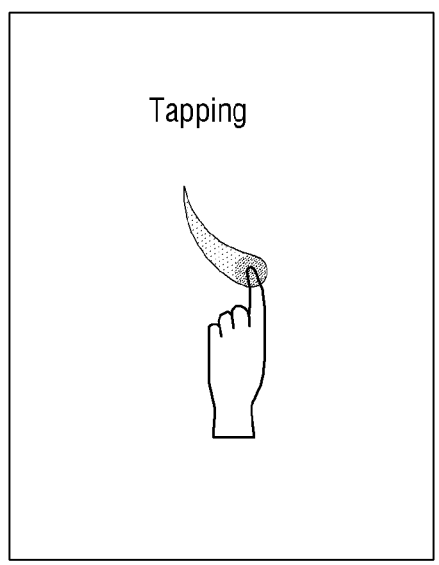

FIG. 7 shows a user drag operation. The drag is the operation which touches a point and moves to another point while still touching. FIG. 8 shows a user rubbing operation. The rubbing is the operation which touches a point and moves forward and backward. FIG. 9 shows a long pressing operation which presses a point over a threshold time. FIG. 10 shows a flicking operation which touches a point and suddenly moves to one direction, and FIG. 11 shows a tapping operation which softly touches with a fingertip. As such, the user can perform the drawing by touching the screen in various fashions.

Figure 12:
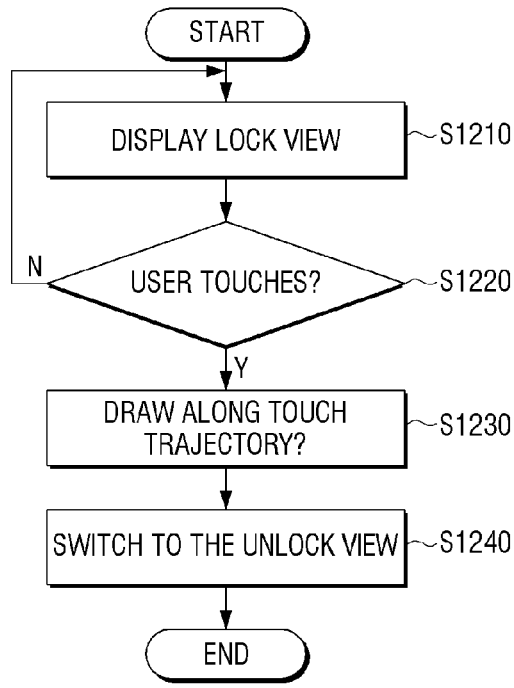
FIG. 12 is a flowchart of an unlocking method, according to an embodiment of the present invention.

FIG. 12 is a flowchart of an unlocking method according to an embodiment of the present invention. Referring to FIG. 12, the display apparatuses 100/500 display the lock view including the affordance object in the lock status, at step S1210. The affordance object can be represented as the image including the connected section and the disconnected section. By touching the screen, at step S1220, the user can draw on the screen, at step S1230.

When the disconnected section is connected by the drawing of the user, the view is switched to the unlock view, at step S1240. When the disconnected section is connected and the image is completed, at least one of the location and the form of the completed image can be changed. For example, when the image of the bird of FIG. 2 is used, after the bird flying away is represented, the view can be switched to the unlock view, at step S1240. The unlock view can be realized as various views as stated above.

Figure 13:
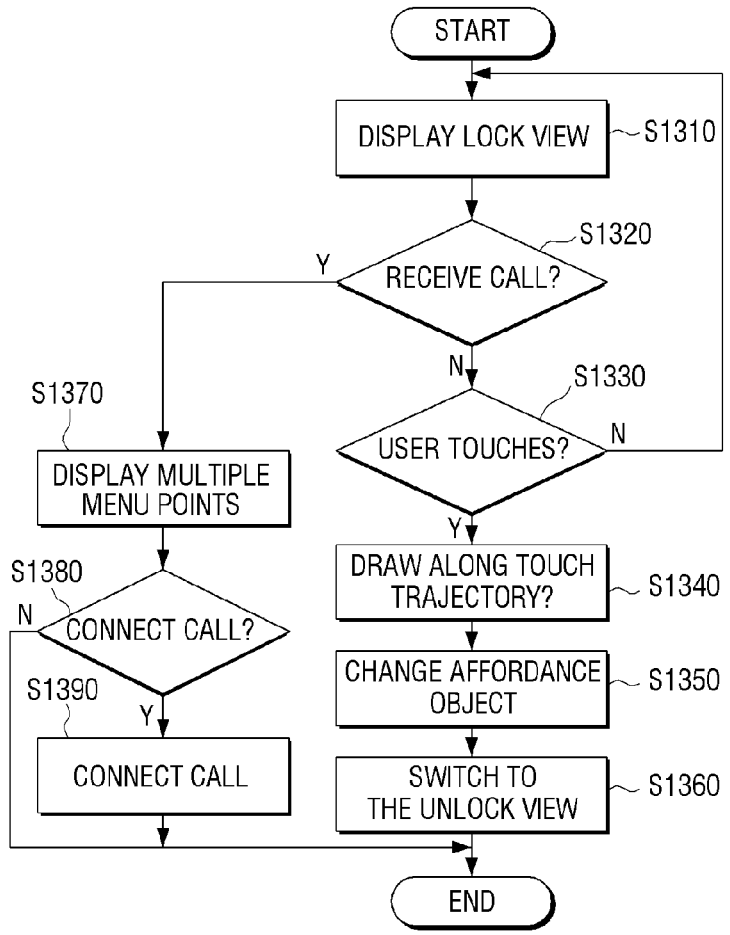
FIG. 13 is a flowchart of an unlocking method, according to another embodiment of the present invention.

FIG. 13 is a flowchart of an unlocking method according to another embodiment of the present invention. Referring to FIG. 13, when the lock view is displayed, at step S1310, and the call is received, at step S1320, the plurality of the menu points is displayed around the affordance object displayed in the lock view, at step S1370. The function is mapped to each menu point. For example, the menu point mapped to the call connection function and the menu point mapped to the call connection rejection function can be displayed together as shown in FIG. 6.

The user can determine whether to connect the call by drawing the disconnected section via the menu point mapped to the call connection function or drawing the disconnected section via the menu point mapped to the call connection rejection function, at step S1380. When the menu point mapped to the call connection is selected, the call is connected, at step S1390, and the call connection view is displayed. By contrast, when the other menu point is selected, the call connection is rejected.

When no call is received, at step S1320 and the user touches the screen, at step S1330, the drawing follows the touch trajectory, at step S1340. When the disconnected section is filled up by the drawing, the affordance object is changed, at step S1350 and the view is switched to the unlock view, at step S1360.

While the plurality of the menu points is displayed when the call is received in FIG. 13, other various operation modes than the call reception mode can be provided. Upon entering such operation modes, the display apparatuses 100/500 can further display at least one menu point mapped to the function of the corresponding operation mode.

When the call is received or the operation mode is changed outside of the lock status, at least one menu point mapped to the function can be displayed.

The affordance object displayed in the lock view and the affordance object displayed when the call is received or the other operation mode is switched can be realized in the same or different form according to embodiments.

As such, since the user releases the lock by touching a certain part of the affordance object, the fixed part is not repeatedly used to release the lock. Since the affordance object varies based on the random determination, the lock can be released by evenly touching the screen. Thus, partial degradation of the touch panel can be prevented, and the user can find it funny to release the lock to thus maximize the user satisfaction.

A program for executing the unlocking methods according to various embodiments of the present general inventive concept can be separately provided and recorded to a recording medium. An apparatus mounted with the recording medium can fulfill the unlocking methods by executing the corresponding program.

In detail, the program for executing the unlocking methods can be contained in various recording media readable by the terminal, such as Random Access Memory (RAM), flash memory, Read Only Memory (ROM), Erasable Programmable ROM (EPROM), Electronically Erasable and Programmable ROM (EEPROM), register, hard disc, removable disc, memory card, USB memory, and CD-ROM.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. A display apparatus comprising:
a display for displaying a first screen corresponding to a lock state of the display apparatus comprising a visual object for guiding a user's manipulation for drawing, the visual object including a first portion and a second portion that is displayed differently from the first portion; and
a processor for, in response to the user's manipulation for drawing being input on one of the first portion and the second portion, controlling the display to switch the first screen to a second screen corresponding to an unlock state.

2. The display apparatus of claim 1, wherein the display displays at least one menu point on the first screen, and in response to trajectory of the drawing passing through the menu point, the processor releases the lock state and executes a function corresponding to the menu point.

3. The display apparatus of claim 1, further comprising:
a storage unit for storing information of a plurality of images, wherein the processor randomly selects at least one of the plurality of images stored to the storage unit and controls the display to generate the visual object using the selected image.

4. The display apparatus of claim 1, further comprising:
a communication unit for receiving a call connection request, wherein, in response to the call connection request being received while the first screen is displayed, the processor controls the display to display a first menu point for call connection and a second menu point for call connection rejection on the first screen, and controls the communication unit to connect the call in response to the trajectory of the drawing passing through the first menu point and to reject the call connection in response to the trajectory of the drawing passing through the second menu point.

5. The display apparatus of claim 1, wherein the first portion comprises a connected section and the second portion comprises a disconnected section, and
the processor controls the display to switch to the first screen while changing a display form of the visual object over a certain time, in response to the disconnected section being connected by the user's manipulation for drawing and the visual object being completed.

6. The display apparatus of claim 1, wherein the first portion comprises a connected section and the second portion comprises a disconnected section, and
the visual object is a constellation image comprising a plurality of stars, the connected section including at least some stars of the plurality of stars interconnected on the constellation image, and the disconnected section including remaining stars of the plurality of stars which are disconnected from each other on the constellation image.

7. The display apparatus of claim 1, wherein the first portion comprises a finished portion and the second portion comprises an unfinished portion, and
wherein, in response to the user's manipulation for drawing being input on the unfinished portion, the processor controls the display to switch the first screen to the second screen.

8. The display apparatus of claim 1, wherein the first portion is displayed by a solid line and the second portion is displayed by a broken line, and
wherein, in response to the user's manipulation for drawing being input on the broken line, the processor controls the display to switch the first screen to the second screen.

9. A method for releasing a lock status, comprising:
displaying a first screen corresponding to a lock state of the display apparatus comprising an visual object for guiding a user's manipulation for drawing, the visual object including a first portion and a second portion that is displayed differently from the first portion; and;
switching the first screen to a second screen corresponding to an unlock state in response to the user's manipulation for drawing being input on one of the first portion and the second portion.

10. The method of claim 9, further comprising:
when a trajectory of the drawing passes through a menu point displayed on the second screen, releasing the lock state and executing a function corresponding to the menu point.

11. The method of claim 9, wherein the visual object is generated by randomly selecting at least one image from a plurality of prestored images.

12. The method of claim 9, further comprising:
receiving a call connection request;
in response to the call connection request being received while the first screen is displayed, displaying a first menu point for call connection and a second menu point for call connection rejection on the first screen; and
connecting the call in response to the trajectory of the drawing passing through the first menu point, and rejecting the call connection in response to the trajectory of the drawing passing through the second menu point.

13. The method of claim 9, wherein, the first portion comprises a connected section and the second portion comprises a disconnected section, and
in response to the disconnected section being connected by the user's manipulation for drawing and the visual object being completed, the switching operation to the first screen switches to the second screen while changing a display form of the visual object over a certain time.

14. The method of claim 9, wherein the first portion comprises a connected section and the second portion comprises a disconnected section, and
the visual object is a constellation image comprising a plurality of stars, the connected section including at least some stars of the plurality of stars interconnected on the constellation image, and the disconnected section including remaining stars of the plurality of stars which are disconnected from each other on the constellation image.

15. The method of claim 9, wherein the first portion comprises a finished portion and the second portion comprises an unfinished portion, and
wherein switching, in response to the user's manipulation for drawing being input on the unfinished portion, includes switching the first screen to the second screen.

16. The method of claim 9, wherein the first portion is displayed by a solid line and the second portion is displayed by a broken line, and
wherein switching, in response to the user's manipulation for drawing being input on the broken line, includes switching the first screen to the second screen.

* * * * *